(12) United States Patent
Stock et al.

(10) Patent No.: US 11,186,213 B2
(45) Date of Patent: Nov. 30, 2021

(54) STORAGE COMPARTMENT FOR A VEHICLE INTERIOR

(71) Applicant: Volkswagen Aktiengesellschaft, Wolfsburg (DE)

(72) Inventors: Christian Stock, Wolfsburg (DE); Christopher Neumann, Wasbuettel (DE); Burkhard Gis, Ruehen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 352 days.

(21) Appl. No.: 16/552,802

(22) Filed: Aug. 27, 2019

(65) Prior Publication Data

US 2020/0062160 A1 Feb. 27, 2020

(30) Foreign Application Priority Data

Aug. 27, 2018 (DE) .................. 10 2018 214 456.7

(51) Int. Cl.
*B60N 3/10* (2006.01)
(52) U.S. Cl.
CPC .................. *B60N 3/103* (2013.01)
(58) Field of Classification Search
CPC ........ B60N 3/103; B60N 3/107; B60N 3/101; B60N 3/108; B60R 7/04
USPC ..................................... 296/37.12
See application file for complete search history.

(56) References Cited

U.S. PATENT DOCUMENTS

| | | | | |
|---|---|---|---|---|
| 7,168,669 | B2* | 1/2007 | Park | B60N 3/101 248/311.2 |
| 7,520,405 | B2 | 4/2009 | Ishida et al. | |
| 8,056,754 | B2* | 11/2011 | Stoner | B60N 3/106 220/533 |
| 8,276,964 | B2 | 10/2012 | Werner et al. | |
| 10,384,580 | B2* | 8/2019 | Medina Luna | B60N 3/002 |
| 2004/0129747 | A1 | 7/2004 | Maierholzner | |
| 2005/0051584 | A1 | 3/2005 | Shelmon et al. | |

(Continued)

FOREIGN PATENT DOCUMENTS

| | | |
|---|---|---|
| DE | 10322299 A1 | 12/2004 |
| DE | 102005056613 A1 | 5/2007 |

(Continued)

*Primary Examiner* — Pinel E Romain
(74) *Attorney, Agent, or Firm* — Muncy, Geissler, Olds & Lowe, P.C.

(57) ABSTRACT

A storage compartment is proposed for a vehicle interior, with a circumferential storage compartment wall, which extends at least substantially vertically and delimits a storage space, and with an insert, reversibly insertable into the storage compartment, with an outer wall and an inner wall, wherein the inner wall is designed partially circular in sections and wherein the insert has pressure elements on the inner wall in order to hold/fix at least one beverage container. The storage compartment is characterized in that an outer contour of the outer wall is substantially identical to an inner perimeter of the storage compartment wall, and in that first positioning elements are disposed on an inner side of the storage compartment wall and second positioning elements, corresponding to the first positioning elements, are disposed on an outer side of the outer wall and by interacting with the first positioning elements fix the insert in a predetermined position within the storage compartment.

10 Claims, 4 Drawing Sheets

(56) References Cited

U.S. PATENT DOCUMENTS

2007/0075205 A1    4/2007   Shin et al.
2007/0182183 A1    8/2007   Lota
2011/0297715 A1   12/2011   Kamiya et al.

FOREIGN PATENT DOCUMENTS

| DE | 102007027533 A1 | 12/2008 |
| DE | 102009030577 A1 | 1/2011 |
| DE | 102011100833 A1 | 11/2012 |
| DE | 102011107598 A1 | 1/2013 |

\* cited by examiner

STORAGE COMPARTMENT FOR A VEHICLE INTERIOR

This nonprovisional application claims priority under 35 U.S.C. § 119(a) to German Patent Application No. 10 2018 214 456.7, which was filed in Germany on Aug. 27, 2018, and which is herein incorporated by reference.

BACKGROUND OF THE INVENTION

Field of the Invention

The present invention relates to a storage compartment for a vehicle interior, with a circumferential storage compartment wall, which extends at least substantially vertically and delimits a storage space, and with an insert, reversibly insertable into the storage compartment, with an outer wall and an inner wall, wherein the inner wall is designed partially circular in sections and wherein the insert has pressure elements on the inner wall in order to hold/fix at least one beverage container, and to a center console for a vehicle with such a storage compartment and a further storage compartment.

Description of the Background Art

Current vehicles, especially motor vehicles, usually offer a variety of different storage options. Storage compartments on the inside of the doors, in the area of the instrument panel, above the glove compartment, and in the center console are often available, so that the vehicle occupants have various options for storing items carried during the drive. It is also known to integrate so-called cup holders into the vehicle interior. These are often designed as foldable and can be folded back again after use, so that they no longer protrude into the vehicle interior.

In many cases, a relatively large storage compartment, which is often referred to colloquially as a jumbo box, is available in the center console. In order to adapt this jumbo box to the user's needs, inserts are known which adapt the shape of the storage compartment formed by the jumbo box to a specific purpose or divide the jumbo box into multiple smaller storage compartments.

DE 10 2007 027 533 A1 discloses an insert for a rectangular storage compartment, an insert that modifies the storage compartment such that one or two round beverage containers can be stored in the storage compartment. The insert is inserted approximately in the middle of the storage compartment and has on its two free sides, which are not in contact with the inner wall of the storage compartment, a rounded contour and pressure elements, so that the beverage containers can be held in conjunction with the inner wall of the storage compartment.

DE 10 2011 100 833 A1 describes a substantially X-shaped insert for a double beverage holder with which the holder can be made smaller and be adapted to hold beverage containers with a smaller diameter than originally intended. The insert has rounded outer surfaces which are arranged on the insert sides facing the interior of the beverage holder and each have a pressure element. An inserted beverage container is then held by an interaction of the inner wall of the beverage holder, the outer wall of the insert, and the particular pressure elements.

DE 10 2016 012 540 A1 discloses an insert for a square storage compartment, with whose help two beverage containers can be held in the storage compartment. The insert has two adjacent circular openings, which are provided with pressure elements and can each receive a beverage container. The insert can be inserted into the storage compartment in two different positions, wherein the orientation of the insert in the two positions differs by 90°. The user can thus decide whether he wants to arrange the two beverage containers one behind the other or side by side when viewed in the direction of travel.

Other beverage holders for vehicles are known from the publications DE 10 2005 056 613 A1, U.S. Pat. No. 7,520,405 B2, and US 2011/0297715 A1.

SUMMARY OF THE INVENTION

It is therefore an object of the present invention to provide a storage compartment with flexible application options, which can be easily adapted to different purposes, is at least largely crash-proof, and enables the storage of beverage containers of different sizes.

The object is achieved by a generic storage compartment in which an outer contour of the outer wall is substantially identical to an inner perimeter of the storage compartment wall, and in which first positioning elements are disposed on an inner side of the storage compartment wall and second positioning elements, corresponding to the first positioning elements, are disposed on an outer side of the outer wall and by interacting with the first positioning elements fix the insert in a predetermined position within the storage compartment.

A storage compartment with such an insert makes a visually high-quality impression, because the insert is difficult to recognize as such and the entire storage compartment is adapted beautifully designed to the current purpose, namely to hold beverage containers. Because the outer contour of the outer wall of the insert is substantially identical to the inner perimeter of the storage compartment wall, a secure fit of the insert in the storage compartment and a high load capacity are achieved. The contour of the outer wall of the insert is correspondingly matched to the shape of the storage compartment, whereas the contour of the inner wall of the insert is adapted to the intended use of the insert. The insert fills the entire storage compartment, so that the visual impression of a makeshift secondary solution is not created under any circumstances. The fact that the outer contour of the outer wall is substantially identical to the inner perimeter of the storage compartment wall means, for example, that the inner side of the storage compartment wall in the inserted state runs parallel to the outer wall of the insert for at least 80% of its length, preferably at least 90% of its length, and only a joint which defines a small distance between the storage compartment wall and the outer wall of the insert runs between the inner wall and the outer wall.

The insert can be designed substantially open downward. In other words, the insert has no bottom, so that the bottom of the storage compartment continues to be used. A material-saving design results in this way, which can thus be produced in a cost- and weight-saving manner. Alternatively, it is also possible that the insert has a partial bottom that extends over part of the base of the insert. For example, the partial bottom can be disposed in the region between the inner wall and the outer wall of the insert.

The inner wall of the insert can have an hourglass-shaped contour. The insert then has a first position and a second position for each beverage container. The interior of the insert tapers in its central area but is not divided into two completely separate areas. The end faces of the interior of the insert can be configured essentially planar. The shape of the interior then can correspond approximately to an elongated rectangle whose long sides approach each other in the middle, abrupt edges being avoided. The perimeter of the inside of the insert, as viewed from above, describes a continuous function with gently changing radii of curvature in the tapering region. In contrast, the corners of the rectangle on which the shape of the interior is based can also be designed to be only relatively slightly rounded. Alternatively, however, the entire end faces can be designed rounded or partially circular in shape in order to adapt the insert to the circular shape of common beverage containers.

The insert can have recessed grips that can be used to remove the insert by a user. At least one operating element for an unlocking mechanism for removing the insert from the storage compartment can be disposed in the recessed grips. The recessed grips can be located centrally between the first position and the second position for the beverage containers. A user can then, for example, engage with a thumb and index finger or a thumb and middle finger of one hand in the recessed grips in order to remove the insert.

For example, when the insert has an hourglass-shaped inner contour, the recessed grips can be disposed in the tapered region of the interior of the insert. The taper thus assumes both the task of adapting the inner wall contour to the beverage containers to be received, as well as providing space for the recessed grips.

A button can be provided for operating the unlocking mechanism on the insert. Such a button or such a knob can unlock the unlocking mechanism, for example, via a lever mechanism or a spring, so that the insert can be removed upwards from the storage compartment. Such a button can be located, for example, in the optionally present recessed grips, but it can also be located at any other location accessible to the user.

The storage compartment can be advantageously designed such that the first positioning elements and the second positioning elements can be locked together. A secure connection between the insert and the storage compartment is achieved in this way and prevents the insert from unintentionally coming loose in the storage compartment or being unintentionally removed from it, for example, when a beverage container held by the insert is grasped.

The insert can be designed such that the insert provides space for one container each on opposite sides of the recessed grips. If the storage compartment is disposed, for example, in the center console or in general between two vehicle seats, each passenger who has access to the storage compartment has his own space for holding a beverage container.

Pressure elements can be disposed in each case on end walls of the insert and on side walls of the insert, and that the pressure elements are oriented such that three pressure elements in each case can hold a container and the forces exerted by the pressure elements on the container have an angle to one another of between 100° and 140°, preferably between 110° and 130°, particularly preferably about 120°. If the insert offers space for two beverage containers and one pressure element is located on each end wall of the insert and two pressure elements are located on each side wall of the insert, a total of three pressure elements are available for each beverage container to be held. If these are oriented such that the forces exerted by them act in directions that are in the aforementioned angular relationships to one another, the beverage container to be held is uniformly acted upon by a force from different directions, which results in a secure and play-free position of the beverage container in the beverage holder.

A partition wall can be provided that can have third positioning elements, which are designed to be complementary to the first positioning elements, so that the at least one partition wall can be inserted into the storage compartment as an alternative to the insert. An even more flexible customizable storage compartment is achieved in this way. If the storage compartment has a total of four first positioning elements, the insert can also have four second positioning elements. A partition wall, which itself has two third positioning elements, can then be attached to two first positioning elements. Thus, in the case just described, there are sufficient first positioning elements to secure two individual partition walls.

The object is further achieved by a center console for a vehicle which has a storage compartment of the invention and a further storage compartment with a circumferential further storage compartment wall, which extends at least substantially vertically and delimits a further storage space, wherein the further storage compartment on an inner side of the further storage compartment wall has further positioning elements for fixing the insert, the partition walls, or a further insert.

Such a center console offers ample storage space and can be used very flexibly. Thus, up to four large beverage containers can be stored at the same time, or one of the storage compartments can be used as a jumbo box and the other as a beverage holder. The fact that both the insert and the partition walls can be used in both storage compartments results in a cost-effective production, because many identical parts can be used.

An exemplary embodiment of a center console of the invention can have a first storage compartment and a second storage compartment. A first insert can be inserted into the first storage compartment, and a second insert can be inserted into the second storage compartment. The two storage compartments can differ in their size and be arranged one behind the other in the center console when viewed in the direction of travel. In this case, the storage compartments can be disposed at the same height or with a height offset to one another. The first storage compartment can already be subdivided once and have a relatively small storage compartment, which is not modified by the insert, in the section facing the second storage compartment.

If both the first insert and the second insert are inserted in the respective storage compartments, there can be a total of four options for receiving a beverage container. In this case, the first insert can have a first container position and a second container position, and in addition, a third container position and the fourth container position can be available in the second insert.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
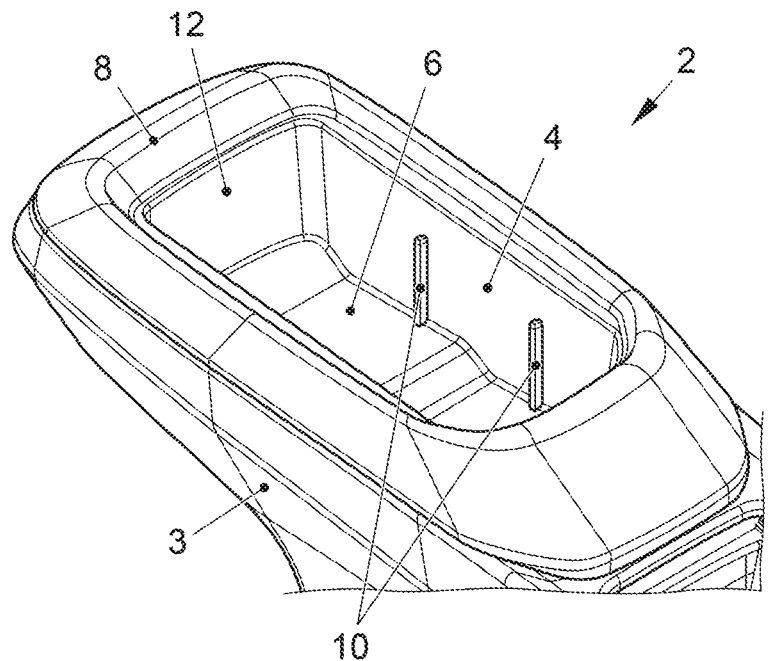
FIG. 1 shows an exemplary embodiment of a storage compartment of the invention in an oblique view from above.

FIG. 1 shows an exemplary embodiment of a storage compartment 2 of the invention for a vehicle in an oblique view from above. Storage compartment 2 is integrated into a vehicle center console 3. It has a bottom 6 and a vertically extending storage compartment wall, of which side wall 4 and rear end wall 12 are visible in the illustrated perspective. Storage compartment 2 has a roughly basic rectangular shape and is closed on its upper side, outside the opening of storage compartment 2, by a frame 8. Bottom 6 is substantially flat, but due to the underlying structure of center console 3 has a step-like structure in which horizontal sections are connected by inclined sections. Furthermore, four rib-shaped, vertically oriented positioning elements 10 are arranged on side wall 4. Overall, storage compartment 2 has four first positioning elements 10, two of which are visible in the figure and two are concealed by the opposite side wall. Positioning elements 10 are positioned spaced from one another approximately symmetrically about an imaginary center line, which is transverse to the direction of travel and divides storage compartment 2 into two equal halves. Positioning elements 10 extend down to bottom 6 of storage compartment 2 and take up about two-thirds of the height of storage compartment 2.

Figure 2:
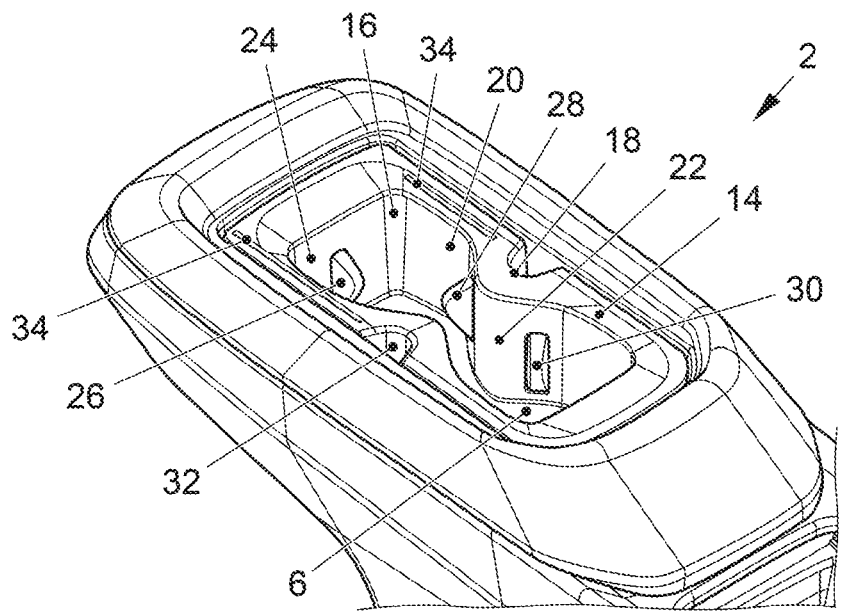
FIG. 2 shows the exemplary embodiment with an inserted insert.

FIG. 2 shows storage compartment 2 from FIG. 1, in which now an insert 14 has been inserted. Insert 14 has an inner wall 16 which can be divided into end faces 24 and the side walls, wherein the side walls in turn have concave sections 20 and convex sections 22. The outer contour of insert 14 almost completely matches the inner contour of storage compartment 2, so that the outer wall of insert 14 lies almost completely against the inner wall of storage compartment 2. Because inner wall 16 of insert 14 runs roughly vertically and insert 14 itself has no bottom above the hourglass-shaped upper opening of the insert, a large part of bottom 6 of storage compartment 2 is exposed.

The concave sections 20 and convex sections 22 of the side walls, when viewed from above, together form a curved structure that causes the interior of insert 14 to taper toward the center, whereby this roughly achieves a shape suitable for receiving cylindrical beverage containers. One pressure element 26 each is arranged in end faces 24. In this case, these are, for example, spring-loaded plastic or rubber elements, which are partially disposed in the cavity between inner wall 16 and the outer wall of the insert and partially protrude into the interior of insert 14. Due to the fact that these are designed to be either pivotable about an axis or parallel to the horizontal, they can project into the interior of insert 14 to different extents, and thus modify the size and shape of the space available for a beverage container. They each exert an inwardly directed force with respect to the interior of insert 14. Further pressure elements are disposed in the side walls and in particular in convex sections 22, so that a total of three pressure elements 26, 28, 30 are present in each half of insert 14 and thus for each available position for a beverage container. Second pressure element 28 and third pressure element 30 are disposed in opposite sections of side wall 16. Pressure elements 26, 28, 30 each exert a force inwardly, whose direction optimally forms an angle of 120° with the direction of the force of one of the other pressure elements 26, 28, 30. When a cylindrical beverage container is inserted, therefore each of pressure elements 26, 28, 30 ideally exerts a force directly directed to the center axis of the beverage container, so that the beverage container can be held securely.

The entire contour formed from inner wall 16 is roughly hourglass-shaped and accordingly has a taper in its center on each side. Recessed grips 32 are disposed in said taper. Due to the arrangement and dimensioning, a user can comfortably engage in recessed grips 32 and remove insert 14 from storage compartment 2. For this purpose, a mechanism can be present within recessed grips 32, which counteracts any previous latching or locking between insert 14 and storage compartment 2.

In addition, two card slots 34, oriented in the longitudinal direction next to the interior of insert 14, can be disposed at the upper side of insert 14. For example, cards in the credit card format can be inserted in these, so that storage compartment 2 is transformed by insert 14 into a multi-functional compartment into which both beverage containers and debit cards, credit cards, or the like can be inserted.

Figure 3:
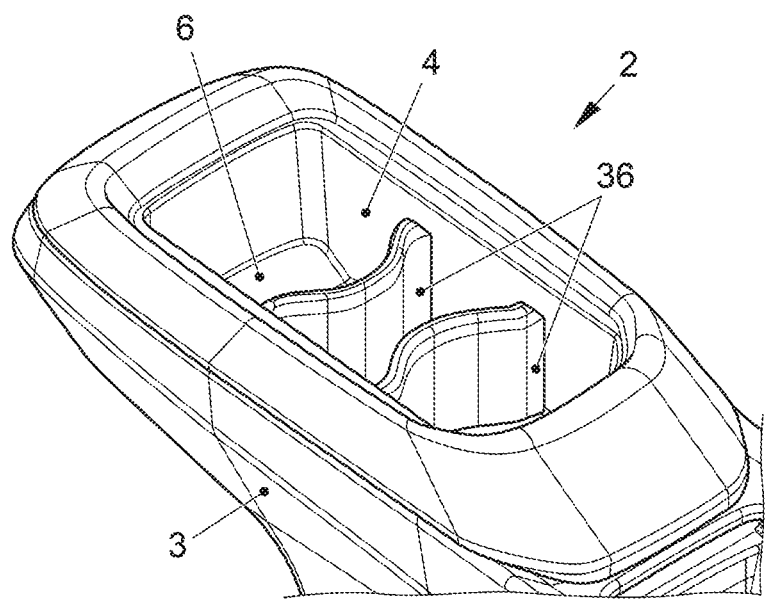
FIG. 3 shows the embodiment with inserted partition walls.

FIG. 3 shows storage compartment 2 from the first two figures, but instead of the insert, two dividing elements 36 are now inserted into storage compartment 2. As in the first two figures, side wall 4 and bottom 6 of storage compartment 2 located in center console 3 can be seen. The two dividing elements 36 divide storage compartment 2 into a total of three smaller compartments. Dividing elements 36 in each case connect the two side walls 4 of storage compartment 2 with one another. In the illustrated exemplary embodiment, dividing elements 36 are designed curved in the form of a double S. Both dividing elements are designed identically and can each be inserted rotated by 180° about a vertical axis into storage compartment 2, which results in different shapes of the resulting partial compartments.

Figure 4:
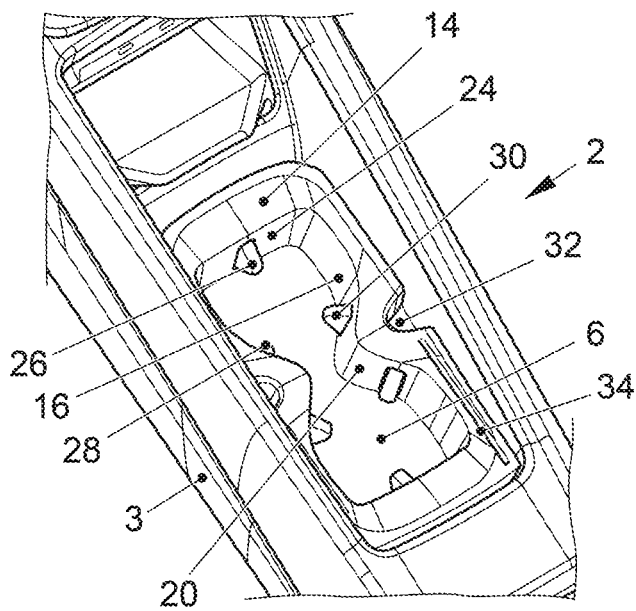
FIG. 4 shows an exemplary embodiment of a storage compartment of the invention in an oblique view from above.

FIG. 4 shows an exemplary embodiment of a storage compartment 2 of the invention from a perspective substantially from above. Storage compartment 2 is again disposed in a center console 3 for a vehicle. Bottom 6, insert 14, inner wall 16, the concave sections 20 of the inner wall, end faces 24, pressure elements 26, 28, and 30, recessed grips 32, and card slots 34 are shown here as well. In each case, three pressure elements 26, 28, 30 together define a holding space for a beverage container. Said holding space can have a diameter of, for example, 6 cm to 7.5 cm.

Figure 5:
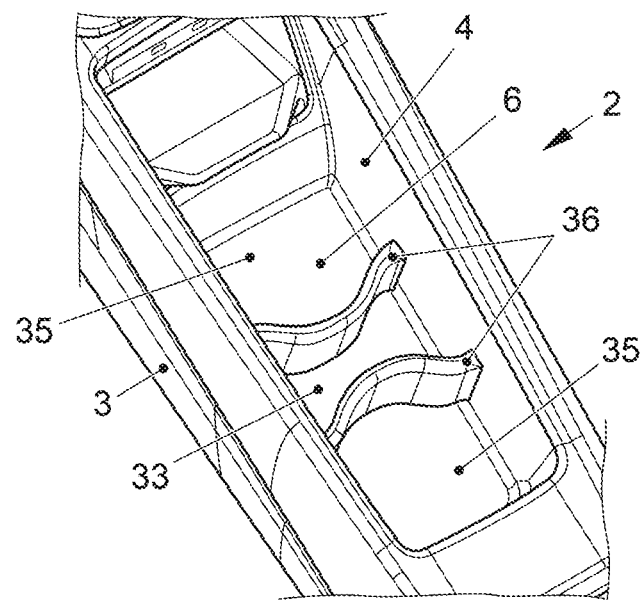
FIG. 5 shows the exemplary embodiment with inserted dividing elements.

FIG. 5 shows an illustration of a storage compartment 2 analogous to FIG. 4 in which dividing elements 36 are inserted instead of the insert. Due to the curved shape of the dividing elements 36, the middle compartment 33 formed by dividing elements 36 is significantly smaller than the two outer compartments 35. An adaptation of the interior of storage compartment 2 to the objects to be stored therein can also be achieved in this way. In particular, a holding device for large beverage containers such as, for example, 1.5 L PET bottles can be created by inserting the curved dividing elements 36. The free diameter of compartments 35 can be at least 10 cm.

Figure 6:
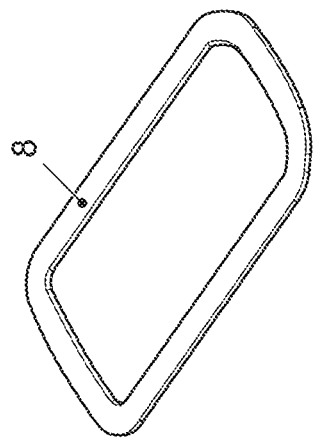
FIG. 6 shows a frame.
Figure 7:
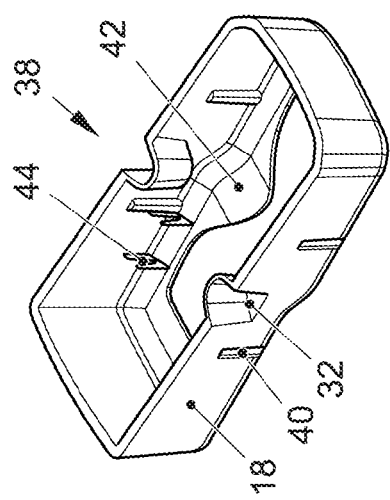
FIG. 7 shows a basic module of an insert of the invention.
Figure 8:
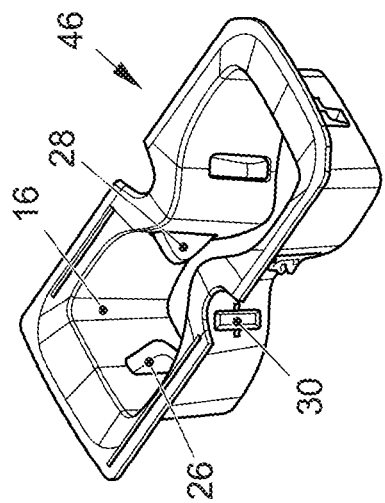
FIG. 8 shows an inner element of an insert of the invention.

The individual parts that make up a complete insert are shown in FIGS. 6 to 8. FIG. 6 shows frame 8 which closes the insert at the top and consists of a plastic strip running horizontally around the entire upper side of the insert.

FIG. 7 shows a basic module 38 that consists substantially of outer wall 18. Outer wall 18 has grooves 40 which are designed to correspond to the rib-shaped positioning elements, which are located in the storage compartment, so that grooves 40 enclose the positioning elements when the insert is inserted into the storage compartment from above. Grooves 40 are preferably made soft to ensure that the insert does not rattle against the storage compartment. It can be seen further that recessed grips 32 take up only part of the height of the insert. Further, basic module 38 has a basic module bottom 42, which, however, when the insert is inserted into the storage compartment covers only part of its bottom. The contour of basic module bottom 42 is adapted to the contour of the inner wall of the insert. In the region of outer wall 18, basic module 38 has holding elements 44, by means of which the cards can be held within the card slots already described above.

Inner element 46 is shown in FIG. 8. Going beyond the details already described above with reference to the illustrations in the assembled and inserted state, it can be seen, in particular with reference to third pressure element 30, that this pressure element 30 extends through an opening in inner wall 16 and is disposed movably therein. The horizontally extending axis of rotation can be seen in the middle region of pressure element 30. The further pressure elements 26, 28 are designed analogously. The pressure effect of pressure elements 26, 28, 30 can be generated in each case by a circumferential silicone ring, individual metal springs, or a resilient embodiment of pressure elements 26, 28, 30 per se. Pressure elements 26, 28, 30 can be designed for this purpose as soft components.

Figure 9:
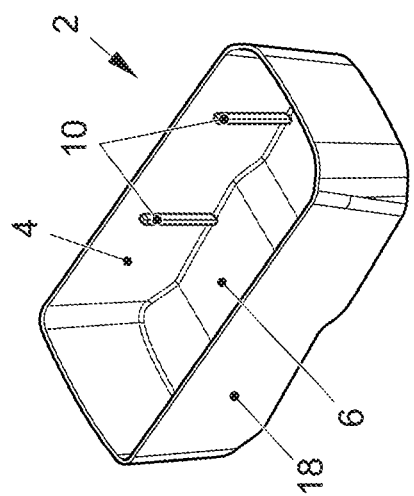
FIG. 9 shows a storage compartment.
Figure 10:
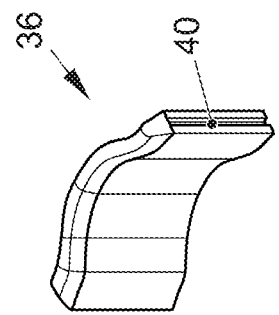
FIG. 10 shows an exemplary embodiment of a dividing element in detail.

FIG. 9 shows a storage compartment 2 outside the context of a center console. Outer wall 18, side wall 4, and bottom 6 can be seen again. Also shown once again are the rib-like projections which are formed on side walls 4 and thus form positioning elements 10. Optionally, the complete insert can be attached to these positioning elements 10 by means of grooves 40 of basic module 38, so that storage compartment 2 can be used as a beverage holder or cup holder, or one or more of dividing elements 36 shown in FIG. 10 can be disposed on positioning elements 10 and thus be attached within storage compartment 2. In this case as well, positioning elements 10 work together with grooves 40 located on dividing elements 36.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A storage compartment for a vehicle interior comprising:
    a circumferential storage compartment wall that extends at least substantially vertically and delimits a storage space;
    an insert adapted to be reversibly insertable into the storage compartment, with an outer wall and an inner wall, the inner wall being partially circular in sections, the insert having pressure elements on the inner wall adapted to hold/fix at least one beverage container, an outer contour of the outer wall being substantially identical to an inner perimeter of the storage compartment wall;
    first positioning elements disposed on an inner side of the storage compartment wall; and
    second positioning elements, corresponding to the first positioning elements, being disposed on an outer side of the outer wall and by interacting with the first positioning elements fix the insert in a predetermined position within the storage compartment.

2. The storage compartment according to claim 1, wherein the insert is substantially open downward.

3. The storage compartment according to claim 1, wherein the inner wall has an hourglass-shaped contour.

4. The storage compartment according to claim 1, wherein the insert has recessed grips in which at least one operating element for an unlocking mechanism for removing the insert from the storage compartment is disposed.

5. The storage compartment according to claim 4, further comprising a button for operating the unlocking mechanism.

6. The storage compartment according to claim 1, wherein the first positioning elements and the second positioning elements are adapted to be locked together.

7. The storage compartment according to claim 1, wherein the insert provides space for one beverage container each on opposite sides of the recessed grips.

8. The storage compartment according to claim 1, wherein pressure elements are disposed on end walls of the insert and on side walls of the insert, and wherein the pressure elements are oriented such that three pressure elements in each case hold a container and the forces exerted by the pressure elements on the container have an angle to one another of between 100° and 140°, between 110° and 130°, or about 120°.

9. The storage compartment according to claim 1, further comprising at least one partition wall that has third positioning elements, which are designed to be complementary to the first positioning elements, so that the at least one partition wall is insertable into the storage compartment as an alternative to the insert.

10. A center console for a vehicle, comprising:
    a storage compartment according to claim 1; and
    a further storage compartment with a circumferential further storage compartment wall, which extends at least substantially vertically and delimits a further storage space,
    wherein the further storage compartment on an inner side of the further storage compartment wall has further positioning elements for fixing the insert, the partition walls, or a further insert.

\* \* \* \* \*